United States Patent
Maric et al.

(10) Patent No.: US 11,340,670 B2
(45) Date of Patent: *May 24, 2022

(54) STRUCTURAL THERMAL SOLUTIONS FOR DISPLAY DEVICES

(71) Applicant: Apple Inc., Cupertino, CA (US)

(72) Inventors: Ivan S. Maric, Sunnyvale, CA (US); Phil M. Hobson, Menlo Park, CA (US); Laura M. Campo, Santa Clara, CA (US); Sivesh Selvakumar, Sunnyvale, CA (US); Jeffrey C. Olson, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/000,850

(22) Filed: Aug. 24, 2020

(65) Prior Publication Data
US 2020/0393881 A1    Dec. 17, 2020

Related U.S. Application Data

(63) Continuation of application No. 16/291,167, filed on Mar. 4, 2019, now Pat. No. 10,782,753.
(Continued)

(51) Int. Cl.
*G06F 1/20* (2006.01)
*G02B 27/01* (2006.01)
*G06F 1/16* (2006.01)

(52) U.S. Cl.
CPC ......... *G06F 1/203* (2013.01); *G02B 27/0176* (2013.01); *G06F 1/163* (2013.01); *G06F 1/1656* (2013.01); *G06F 1/206* (2013.01)

(58) Field of Classification Search
CPC .................. G02B 27/0176; G06F 1/203
See application file for complete search history.

(56) References Cited

U.S. PATENT DOCUMENTS 5,764,314 A    6/1998   Narayan et al.
5,815,126 A *  9/1998   Fan ................ G02B 27/017
                                                        345/7
(Continued)

FOREIGN PATENT DOCUMENTS

CN    203825330 U    9/2014
CN    105446443 A    3/2016
(Continued)

OTHER PUBLICATIONS

International Search Report and Written Opinion issued in co-pending International Application No. PCT/US2019/019930 dated Apr. 24, 2019 (14 pp).

*Primary Examiner* — Mukundbhai G Patel
(74) *Attorney, Agent, or Firm* — Young Basile Hanlon & MacFarlane, P.C.

(57) ABSTRACT

A display system, such as a wearable display device, includes a system housing including a cavity having a linear axis extending generally in parallel with first and second side walls enclosing the cavity and a display stack enclosed within the cavity and movable along the linear axis. The display stack includes a display panel and a support chassis configured to support a first side of the display panel and thermally couple the display panel to the first side wall to facilitate heat transfer from the display panel, across the support chassis, and to the system housing The display stack includes a heat sink configured for support by a second side of the display panel and to thermally couple the display panel to the second side wall to facilitate heat transfer from the display panel, across the heat sink, and to the system housing.

20 Claims, 8 Drawing Sheets

Related U.S. Application Data

(60) Provisional application No. 62/723,643, filed on Aug. 28, 2018.

(56) References Cited

U.S. PATENT DOCUMENTS

| | | | |
|---|---|---|---|
| 5,844,530 | A | 12/1998 | Tosaki |
| 8,472,120 | B2 | 6/2013 | Border et al. |
| 2002/0181115 | A1* | 12/2002 | Massof .............. G02B 27/0172 359/630 |
| 2008/0285120 | A1* | 11/2008 | Lo ...................... G02B 26/0833 359/361 |
| 2015/0029661 | A1* | 1/2015 | Huang .................... H01L 35/08 361/679.54 |
| 2017/0184863 | A1 | 6/2017 | Balachandreswaran et al. |
| 2017/0358136 | A1* | 12/2017 | Gollier ................... G06F 1/163 |
| 2018/0067317 | A1* | 3/2018 | Barton ............... G02B 27/0176 |

FOREIGN PATENT DOCUMENTS

| | | |
|---|---|---|
| CN | 206024378 U | 3/2017 |
| CN | 206074916 U | 4/2017 |
| CN | 207151069 U | 3/2018 |
| CN | 207318849 U | 5/2018 |
| CN | 207851410 U | 9/2018 |

\* cited by examiner

STRUCTURAL THERMAL SOLUTIONS FOR DISPLAY DEVICES

CROSS-REFERENCE TO RELATED APPLICATIONS

This application is a continuation of U.S. application Ser. No. 16/291,167 filed on Mar. 4, 2019, entitled "Structural Thermal Solutions for Display Devices," which claims priority to U.S. Provisional Application Ser. No. 62/723,643, filed Aug. 28, 2018, entitled "Structural Thermal Solutions for Display Devices," the contents of which are incorporated herein by reference.

FIELD

The present disclosure relates generally to display technologies, and, more particularly, to structures and methods of cooling high-resolution display panels (e.g., OLED or uOLED panels) used, for example, in wearable head-mounted displays (HMDs).

BACKGROUND

Certain display panels, such as OLED and uOLED panels, for example, can operate at high temperatures. In known systems, such as wearable HMDs, for example, display panels are usually supported by a carrier, bezel, or other such structure, which is often formed from a lightweight material (e.g., plastic) to reduce the overall weight of the systems. These structures, however, offer little benefit in terms of thermal regulation. Without proper cooling and heat dissipation, the panels (which are expensive and difficult to replace) can degrade over time, often resulting in irreparable damage or system failure. To manage and offset the heat generated by the panels during use, and thereby increase their usable life, display systems will often incorporate additional components, such as heat sinks. These additional components, however, create design challenges and add to the overall weight of the systems.

The present disclosure addresses these challenges by providing a display system that integrates thermal solutions into structural components. This combined functionality not only reduces the overall number of components, complexity, and weight of the display system, but increases thermal conductivity and improves thermal management to decrease operating temperatures and extend the system's usable life.

SUMMARY

In one aspect of the present disclosure, a wearable head-mounted display (HMD) is disclosed that includes an internal system housing defining an interior space and a display stack that is positioned within the interior space. In various embodiments, it is envisioned that the display stack may be either fixed in relation to the system housing or movable in relation to the system housing. The display stack includes a display panel, a carrier supporting the display panel, and a heat sink. The carrier, the display panel, and the heat sink are secured together such that they are movable in unison within the system housing to adjust focus of the display panel. The carrier and the heat sink respectively include first and second thermal solutions to facilitate heat transfer away from the display panel. Throughout the present disclosure, the term "thermal solution" should be understood to include any metallic or non-metallic material having high thermal-conductivity properties (e.g., graphite, stainless steel, copper, aluminum, magnesium, titanium, and alloys thereof, either individually or in combination) and/or any structure that is configured to facilitate the transfer of heat away from the display panel(s) disclosed herein.

In certain embodiments, the display panel may be positioned between the carrier and the heat sink.

In certain embodiments, the HMD may further include an actuator in mechanical cooperation with the display stack to reposition the display stack within the system housing.

In certain embodiments, the actuator may be secured to the system housing.

In certain embodiments, the actuator may be mechanically connected to the carrier. Alternatively, the actuator may be mechanically connected to the heat sink.

In certain embodiments, the display stack may be mechanically connected to the system housing to support the display stack during movement within the system housing.

In certain embodiments, the display stack and the system housing may include corresponding guide members to facilitate movement of the display stack in relation to the system housing. For example, it is envisioned that the guide member(s) included on the system housing may engage one or more corresponding guide members provided on the carrier and/or the heat sink.

In certain embodiments, the guide members included on the system housing and the display stack (e.g., on the heat sink and/or the carrier) may be configured for relative linear movement.

In certain embodiments, the first and second thermal solutions may include at least one surface discontinuity to increase the exposed surface area of the carrier and the heat sink. For example, the at least one surface discontinuity may be configured as one or more extensions (projections) depending outwardly from exposed surfaces of the carrier and the heat sink and/or one or more recesses extending inwardly into the carrier and the heat sink. In various embodiments, the recess(es) may extend either partially into the carrier or entirely through the carrier.

In certain embodiments, the first and second thermal solutions may include one or more thermally-conductive materials, which may be either metallic or non-metallic.

In another aspect of the present disclosure, a wearable display system is disclosed, such as a head-mounted display, that includes an internal system architecture having a first guide member, a display stack having a second guide member configured for engagement with the first guide member such that the display stack is movable in relation to the system architecture, and an actuator in mechanical cooperation with the display stack to reposition the display stack in relation to the system architecture. The display stack includes a display panel having opposed first and second sides, a chassis (carrier) that is positioned proximate (e.g., adjacent to or in direct contact with) the first side of the display panel, and a thermal conductor (e.g., a heat sink), either metallic or non-metallic, that is positioned proximate (e.g., adjacent to or in direct contact with) the second side of the display panel.

In certain embodiments, the chassis includes a metallic material and at least one surface discontinuity to increase the exposed surface area and heat dissipation (thermal management) in the chassis, and the thermal conductor includes at least one surface discontinuity to increase the exposed surface area and heat dissipation in the thermal conductor.

In certain embodiments, the second guide member may be included on the chassis.

In certain embodiments, the second guide member may be included on the thermal conductor.

In certain embodiments, the surface discontinuities may be integrally formed with the chassis and the thermal conductor.

In certain embodiments, the surface discontinuities may include one or more extensions (projections) depending outwardly from exposed surfaces of the chassis and the thermal conductor and/or one or more recesses extending inwardly into the chassis and the thermal conductor. In various embodiments, the recess(es) may extend either partially into the chassis and/or the thermal conductor or entirely through the chassis and/or the thermal conductor.

In certain embodiments, the first and second guide members may be configured for relative linear movement such that the display stack is repositionable between a multitude of positions along a longitudinal axis of the HMD to adjust focus of the display panel and cause air circulation within the HMD to facilitate heat dissipation from the display panel.

In certain embodiments, the thermal conductor may be configured to support one or more electrical components of the HMD.

In another aspect of the present disclosure, a method is disclosed for reducing heat within a wearable display system including a display panel, such as a head-mounted display, for example. The method includes providing at least one thermal solution on a movable display stack supporting the display panel and repositioning the display stack within an internal system housing of the HMD to intake and expel air from the system housing such that air flows across (or relative to) the at least one thermal solution to transfer heat away from the display panel. Depending upon system architecture, the particular location of the thermal solution(s), spatial requirements, desired airflow and cooling, etc., it is envisioned that air may flow in one or more directions from one or more angles. To increase the exposed surface area and heat dissipation in the display stack and reduce thermal resistance between the display stack and the surrounding air, the at least one thermal solution may include one or more extensions depending (projecting) from exposed surfaces of the display stack and/or one or more recesses extending inwardly into the display stack.

In certain embodiments, the movable display stack includes a display panel including opposing first and second sides and a chassis positioned proximate the first side of the display panel. The chassis includes a metallic material and at least one surface discontinuity to increase exposed surface area and heat dissipation in the chassis. The display panel also includes a thermal conductor positioned proximate the second side of the display panel, and the thermal conductor includes at least one surface discontinuity to increase exposed surface area and heat dissipation in the thermal conductor.

DETAILED DESCRIPTION

The present disclosure describes various structures and methods of managing heat generated during the operation of display systems. More specifically, the present disclosure addresses the aforementioned challenges in known display systems by integrating thermal solutions into structural components. This combined functionality not only reduces the overall number of components, complexity, and weight of the display system, but increases thermal conductivity and heat dissipation (thermal management) to decrease operating temperatures and extend the system's usable life. Although described in the context of a wearable, head-mounted display (HMD) throughout the present disclosure, the structures, methods, and principles discussed herein may find additional applicability in connection with other display systems.

The display system(s) discussed herein include a display stack with a high-resolution display panel (e.g., an OLED panel, uOLED panel, or the like) that is supported by a carrier. To transfer heat away from the display panel, and thereby reduce operating temperatures and increase the usable life of the display panel, the display stack includes one or more thermal solutions. The thermal solutions discussed herein, however, also provide structure and stability to the display system in that they support one or more additional components of the system, and thus provide dual functionality. For example, the carrier, which supports the display panel, may include a particular geometry, as well as one or more extensions (e.g., fins) and/or one or more recesses (e.g., indentations, cutouts, etc.), to increase the exposed surface area and heat dissipation in the carrier. To further increase the transfer of heat away from the display panel, the display stack may also include a heat sink to incorporate an additional thermal solution. In such embodiments, the heat sink may provide an interface between the display stack and an internal system housing to support the display stack during movement as the display panel is focused. As with the carrier, the heat sink may include a particular geometry, as well as one or more extensions (e.g., fins) and/or one or more recesses (e.g., indentations, cutouts, etc.), to increase the exposed surface area and heat dissipation in the heat sink.

Figure 1:
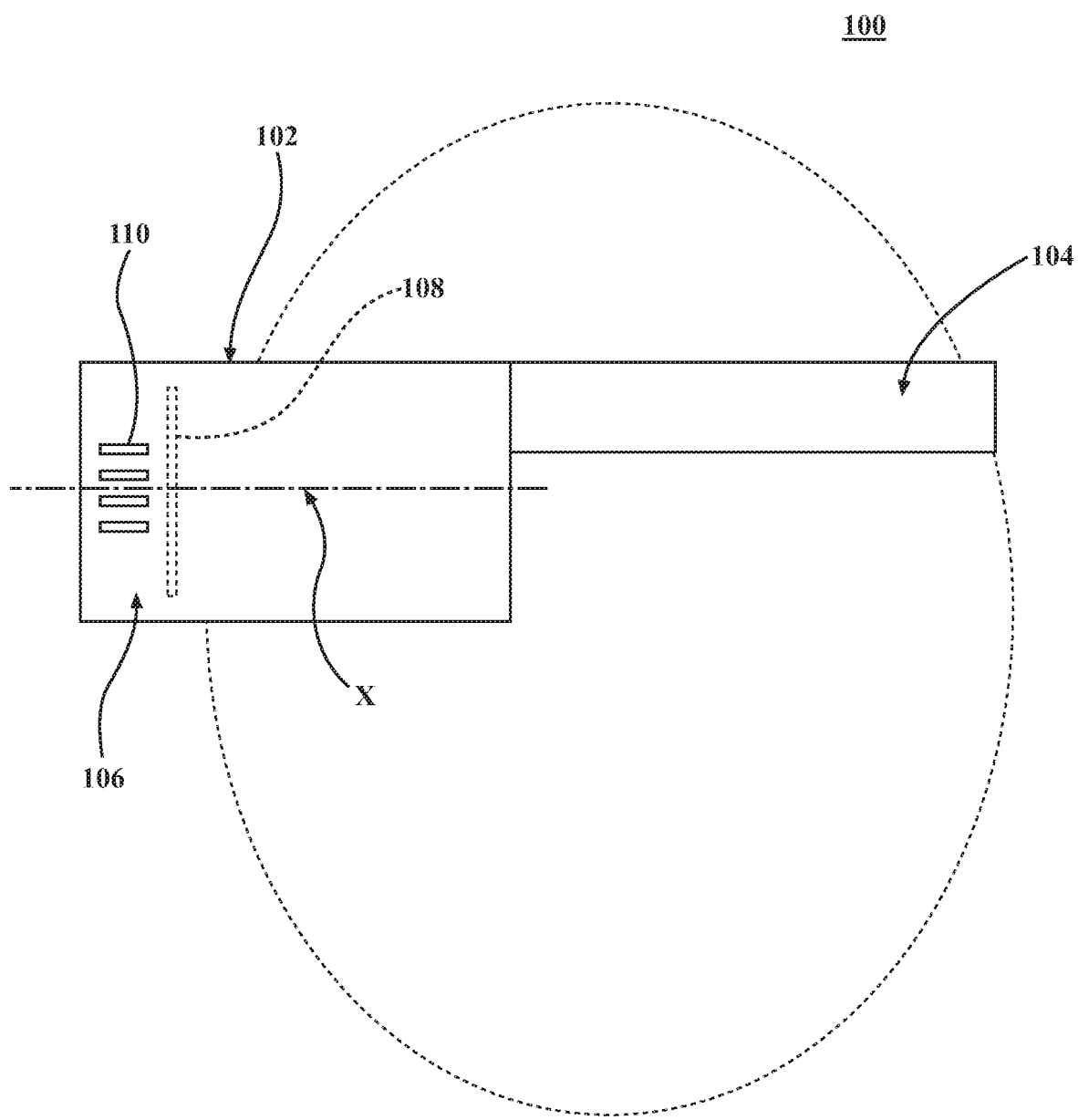
FIG. 1 is a top, perspective view of a display system configured as a wearable HMD in accordance with the principles of the present disclosure.

FIG. 1 generally illustrates a display system 100 according to the principles of the present disclosure. In the particular embodiment illustrated in FIG. 1, the display system is configured as an HMD 102 including one or more wearable supports 104 (e.g., a head strap, temples, etc.). It should be appreciated, however, that the configuration and/or intended use of the display system 100 may be varied in alternate embodiments of the disclosure. For example, the display system 100 may be configured and intended for stationary use in a vehicle.

The display system 100 includes an outer housing 106 that accommodates the various internal components of the display system 100 discussed below, and may include (e.g., may be formed from) any suitable material, such as plastics (e.g., PC or ABS), polymers, metallic materials, etc., either individually or in any proper combination. The outer housing 106 defines an internal viewing window 108, which may include an opening, one or more optical ports, or the like, and may be formed through any suitable method of manufacture (e.g., injection molding, 3-D printing, etc.). To facilitate airflow and the transfer of heat from within the display system 100, the outer housing 106 may include one or more openings 110 (e.g., recesses, slits, vents, etc.).

Figure 2:
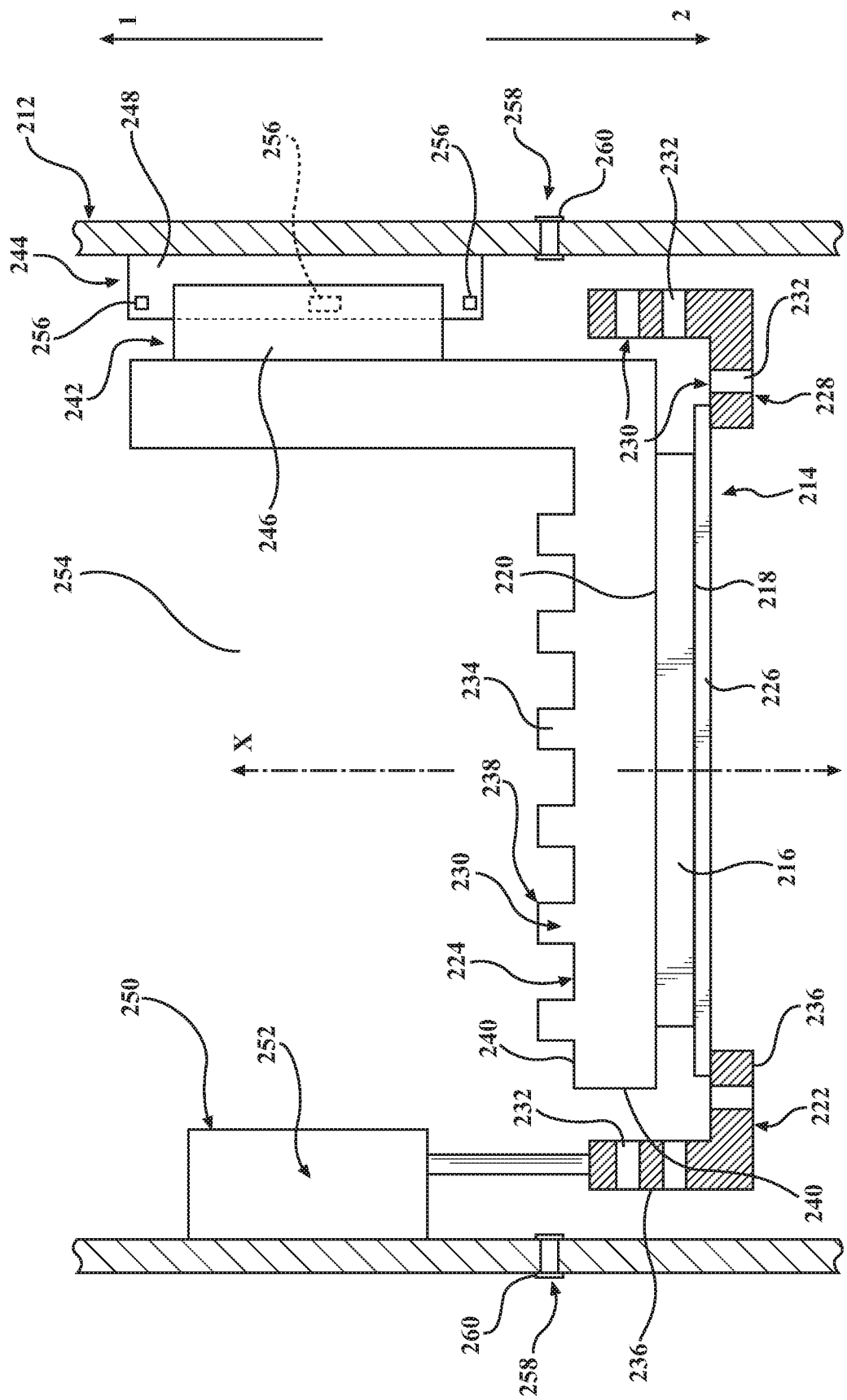
FIG. 2 is a partial cross-sectional view of the display system seen in FIG. 1 including one embodiment of a display stack.

With reference now to FIG. 2 as well, the display system 100 includes an internal system housing 212 and a repositionable display stack 214, each of which is accommodated within the outer housing 106 (FIG. 1). The system housing 212 supports the display stack 214, as well as other components of the display system 100, and may include any architecture suitable for this intended purpose. The system housing 212 may include (e.g., may be formed from) any suitable material, such as plastics (e.g., PC or ABS), polymers, metallic materials, etc., either individually or in any proper combination, and may be formed through any suitable method of manufacture (e.g., injection molding, 3-D printing, etc.).

The display stack 214 includes a display panel 216 with opposed first and second sides 218, 220, respectively; a carrier (chassis) 222 that supports the display panel 216; and a heat sink (thermal conductor) 224. The display panel 216 is visible through the viewing window 108 (FIG. 1) in the outer housing 106 and may be any panel suitable for the intended purpose of displaying an image, video, etc., including, for example, an OLED panel, a uOLED panel, or the like.

The carrier 222 is configured to support the display panel 216, either directly or indirectly. For example, in the embodiment illustrated in FIG. 2, the first side 218 of the display panel 216 is secured to a protective member 226 (e.g., a glass cover, screen, etc.) that is directly connected to the carrier 222. To increase thermal conductivity, it is envisioned that the protective member 226 may be doped with conductive elements or materials (e.g., to improve heat conduction from the carrier 222). The carrier 222, the display panel 216, and the protective member 226 may be secured together in any suitable manner. For example, in certain embodiments, it is envisioned that a pressure-sensitive adhesive (PSA) may be used either alone or in combination with a thermal filler (not shown), such as a gap pad, thermal paste, or other such suitable member or material. The use of the PSA and/or the thermal filler may serve to reduce (or prevent) the formation of air pockets between adjacent components (e.g., between the carrier 222 and the protective member 226 and/or between the protective member 226 and the display panel 216), thereby reducing thermal resistance.

Figure 3:
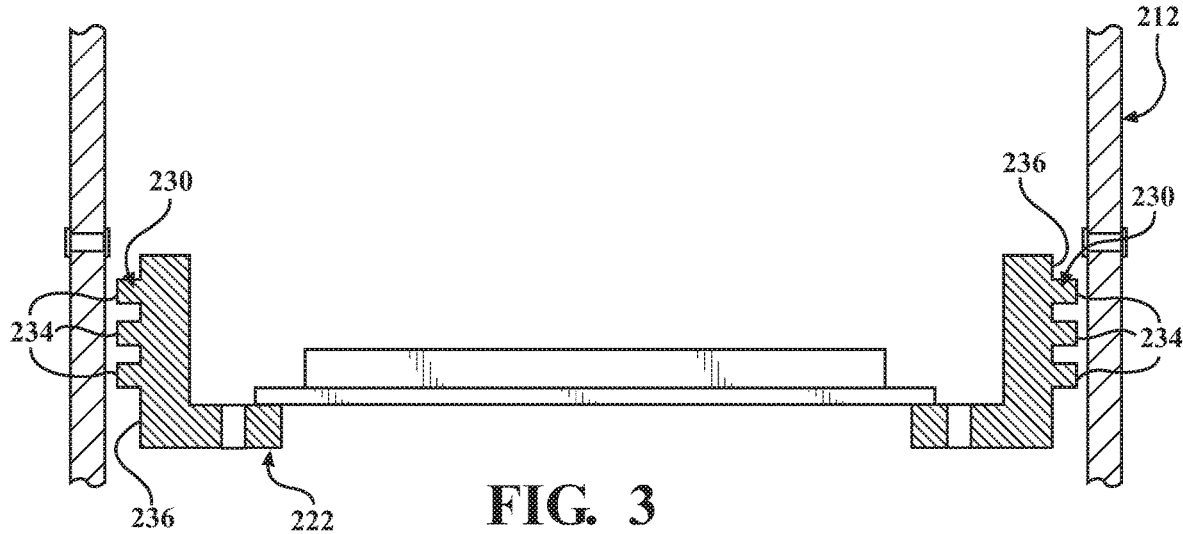
FIGS. 3-10 are side, cross-sectional views of alternate embodiments of the display stack seen in FIG. 2.
Figure 4:
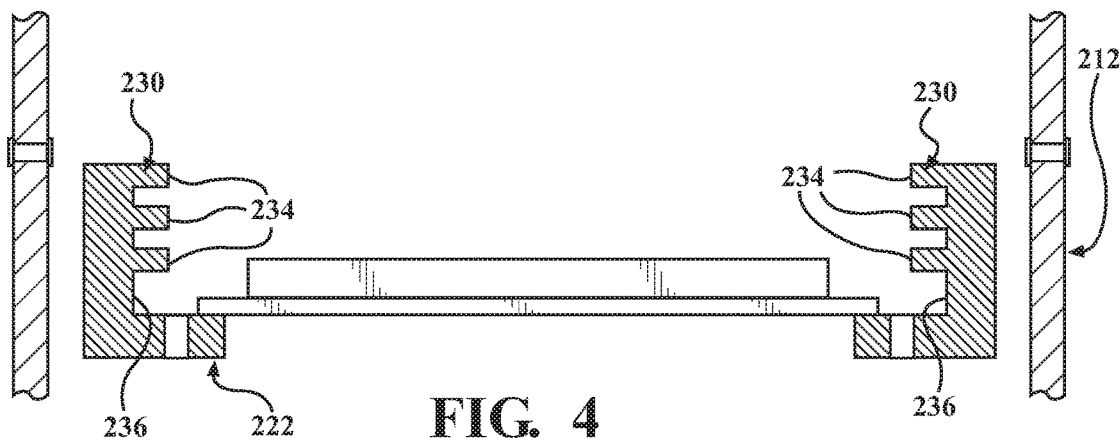
Figure 5:
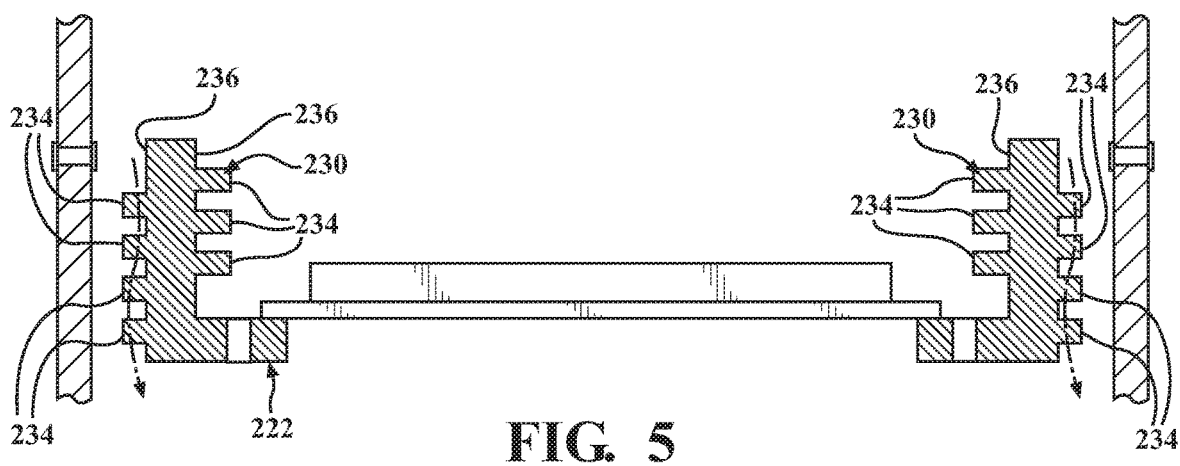
Figure 6:
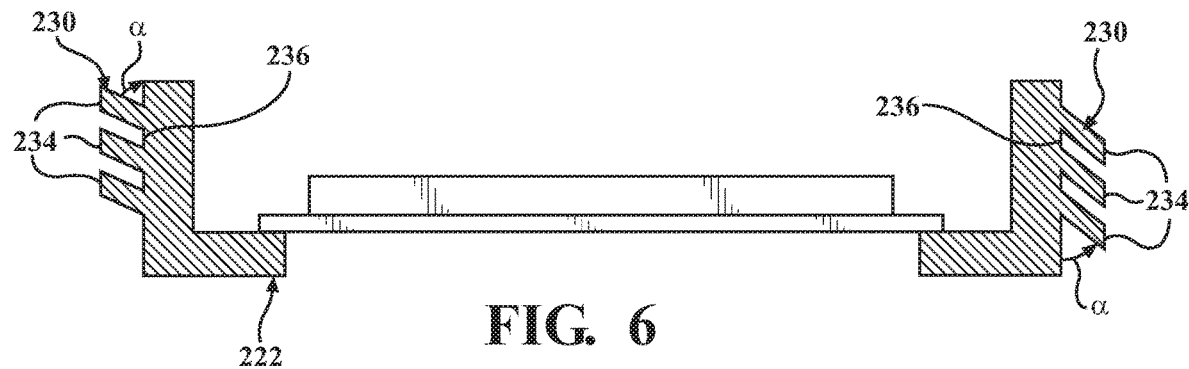

To facilitate the transfer of heat generated during use away from the display panel 216, the carrier 222 may include a thermal solution 228, which may be any material of construction or structure suitable for this intended purpose. For example, it is envisioned that the carrier 222 may include (e.g., may be formed from) one or more metallic or non-metallic materials having high thermal-conductivity (e.g., graphite, stainless steel, copper, aluminum, magnesium, titanium, and alloys thereof) either individually or in combination, which may allow for a more uniform temperature distribution across the carrier 222. Additionally, or alternatively, the thermal solution 228 may include a particular geometry and/or structures or features that are configured to increase the exposed surface area of the carrier 222. For example, as seen in FIG. 2, the thermal solution 228 may include one or more surface discontinuities 230 configured as openings 232 that extend inwardly into the carrier 222, either partially (so as to define a recess, indentation, channel, etc.) or entirely therethrough (so as to define an opening, vent, etc.). Additionally, or alternatively, the surface discontinuities 230 may include one or more extensions 234 or projections (e.g., fins) that depend outwardly from an exposed surface 236 of the carrier 222, as seen in FIGS. 3-5. Depending on the particular system architecture employed, the particular location of the extensions 234, spatial requirements, desired airflow and cooling, etc., it is envisioned that the extensions 234 may extend outwardly (i.e., towards the system housing 212), as seen in FIG. 3; inwardly (i.e., away from the system housing 212), as seen in FIG. 4; or in a variety of directions, as seen in FIG. 5. The extensions 234 may extend in generally orthogonal relation to the exposed surface 236 of the carrier 222, as seen in FIGS. 3-5, for example, or in non-orthogonal relation (e.g., the extensions 234 may define one or more acute angles α with the exposed surface 236 of the carrier 222), as seen in FIG. 6. It is envisioned that the extensions 234 may be either integrally (e.g., monolithically) formed with the carrier 222, or that the extensions 234 may be secured to the carrier 222 via mechanical structures (such as welds, rivets, etc.), chemical bonding (e.g., via an adhesive), through thermal bonding, or through any other suitable method of attachment.

With continued reference to FIG. 2, the heat sink 224 will be discussed. In the illustrated embodiment, the heat sink 224 is positioned proximate (e.g., adjacent to) the second side 220 of the display panel 216, and is secured directly thereto. It should be appreciated, however, that the particular location and/or orientation of the heat sink 224 may be varied in alternate embodiments of the disclosure. For example, as discussed above in connection with the carrier 222, in certain embodiments, a thermal filler (not shown), such as a gap pad, thermal paste, or other such suitable member or material may be positioned between the heat sink 224 and the display panel 216 to reduce (or prevent) the formation of air pockets between the heat sink 224 and the display panel 216, thereby reducing thermal resistance. It is envisioned that the heat sink 224 and the display panel 216 (as well as the thermal filler, if included) may be secured together in any suitable manner, such as through the use of a PSA, fasteners, a clamping assembly, or the like.

The heat sink 224 is configured, positioned, and adapted to conduct heat away from the display panel 216, thereby acting as a conduit for heat transfer. To facilitate the transfer of heat away from the display panel 216, as discussed in connection with the carrier 222, the heat sink 224 may include a thermal solution 238, which may be any material of construction or structure suitable for this intended purpose. For example, it is envisioned that the heat sink 224 may include (e.g., may be formed from) one or more metallic or non-metallic materials having high thermal-conductivity (e.g., graphite, stainless steel, copper, aluminum, magnesium, titanium, and alloys thereof) either individually or in combination, which may allow for a more uniform temperature distribution across the heat sink 224.

Figure 7:
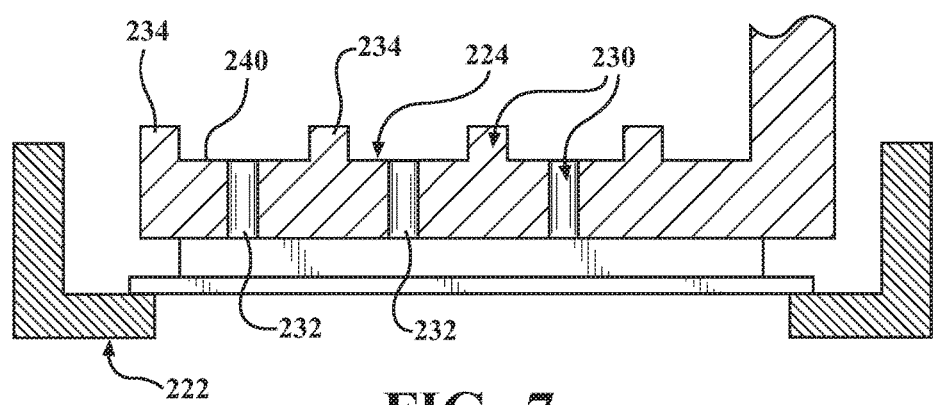
Figure 8:
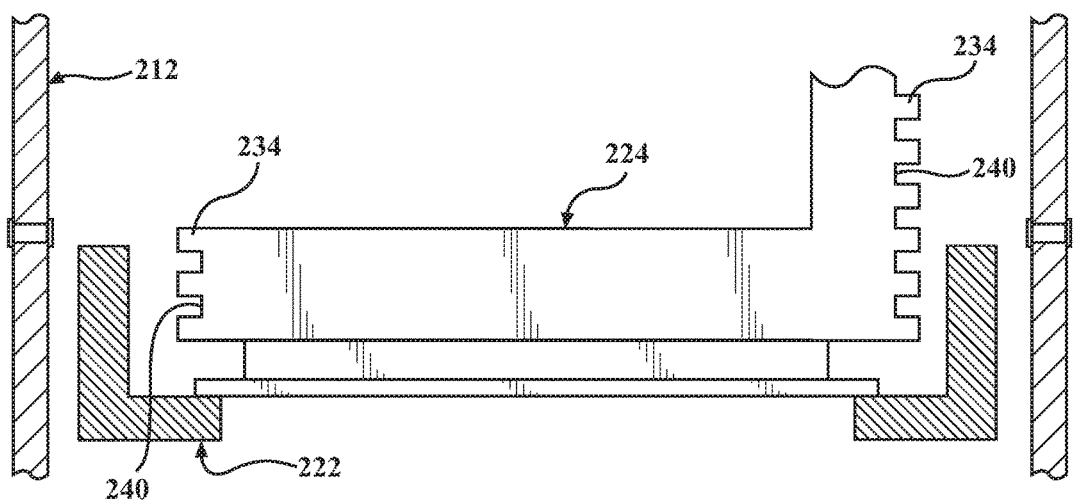
Figure 9:
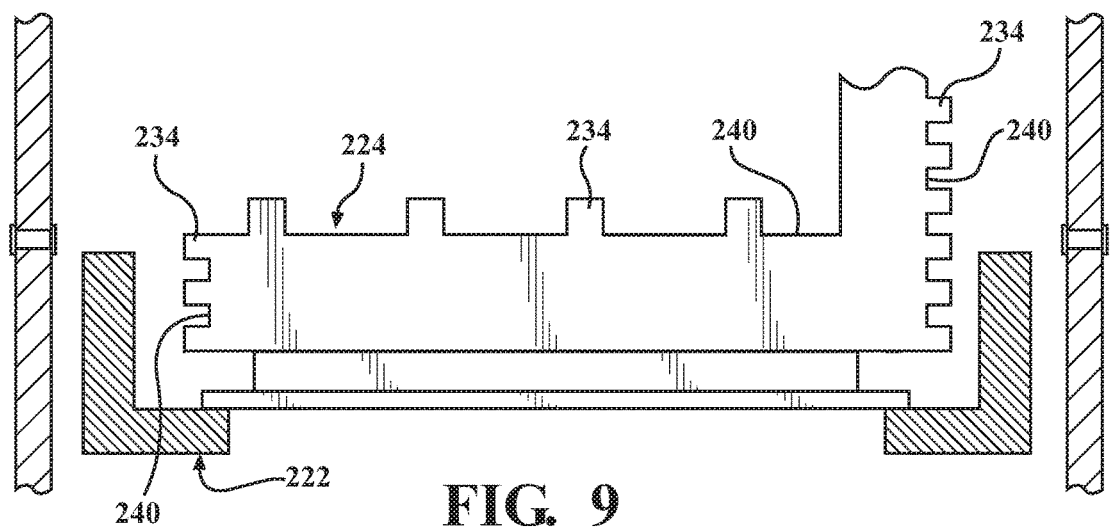
Figure 10:
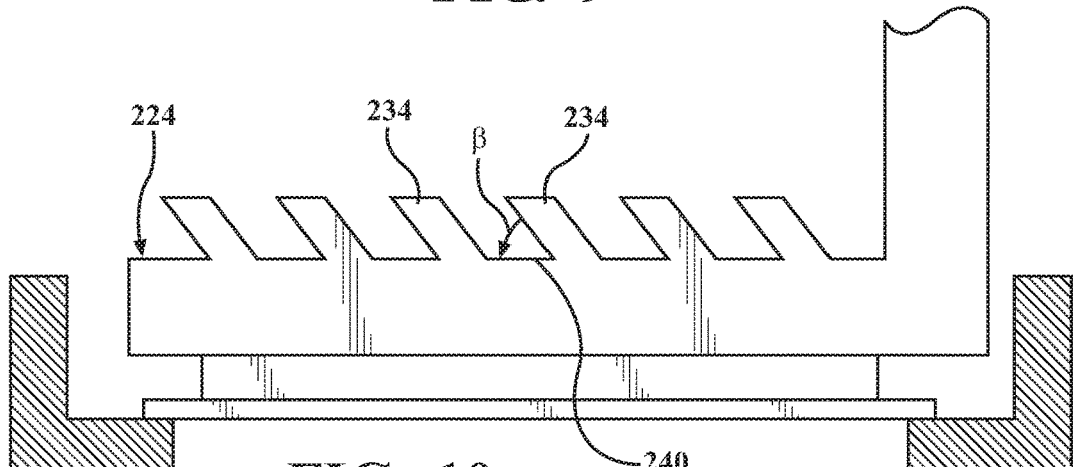

Additionally, or alternatively, the thermal solution 238 may include a particular geometry and/or structures or features that are configured to increase the exposed surface area of the heat sink 224. For example, as discussed in connection with the carrier 222, the heat sink 224 may include one or more surface discontinuities 230, such as the extensions 234 (e.g., fins) depending outwardly from an exposed surface 240 of the heat sink 224 seen in FIG. 2, and/or the openings 232 (e.g., recesses, indentations, channels, vents, etc.) seen in FIG. 7. Depending on the system architecture employed, the particular location of the extensions 234, spatial requirements, desired airflow, etc., it is envisioned that the extensions 234 may extend inwardly, away from the carrier 222, as seen in FIGS. 2 and 7; outwardly, towards the system housing 212, as seen in FIG. 8; or in a variety of directions, as seen in FIG. 9. The extensions 234 may extend in generally orthogonal relation to the exposed surface 240 of the heat sink 224, as seen in FIGS. 2 and 7-9, for example, or in non-orthogonal relation (e.g., the extensions 234 may define one or more acute angles with the exposed surface 240 of the heat sink 224), as seen in FIG. 10. It is envisioned that the extensions 234 may be either integrally (e.g., monolithically) formed with the heat sink 224, or that the extensions 234 may be secured to the heat sink 224 via mechanical structures (such as welds, rivets, etc.), chemical bonding (e.g., via an adhesive), through thermal bonding, or through any other suitable method of attachment.

Although the heat sink 224 is shown and described as a component of the display stack 214 hereinabove, embodiments of the disclosure devoid of the heat sink 224 would not be beyond the scope of the present disclosure. For example, the heat sink 224 may be eliminated due to restrictions in the system architecture, spatial requirements, desired operating temperature, and/or the desired level of cooling, etc.

With reference again to FIG. 2, the display stack 214 is operatively connected to the system housing 212 to allow for movement of the display stack 214 through a range of motion including a multitude of positions to adjust the position and, thus, focus of the display panel 216. For example, in the particular embodiment seen throughout the figures, the display stack 214 is operatively connected to the system housing 212 for movement along a longitudinal axis X (FIGS. 1, 2) of the display system 100 to allow for movement of the display panel 216 towards and away from a user. To facilitate such movement, as seen in FIG. 2, the display stack 214 and the system housing 212 include corresponding guide systems 242, 244, which are configured as low-friction guide rails 246, 248, respectively. It should be appreciated, however, that the particular configuration, orientation, and operation of the guide systems 242, 244 may be altered in various embodiments of the disclosure. For example, the guide systems 242, 244 may include one or more bushings or couplings (not shown) that are movable along corresponding guide rods, either in addition to or instead of the guide rails 246, 248. Moreover, although shown as being generally linear in configuration, in alternate embodiments, depending upon the particular system architecture, desired movement, application of the display system 100, etc., it is envisioned that the guide rails 246, 248 may include one or more non-linear (e.g., curvate) sections to permit both lateral and longitudinal movement of the display stack 214 within the system housing 212.

Figure 11:
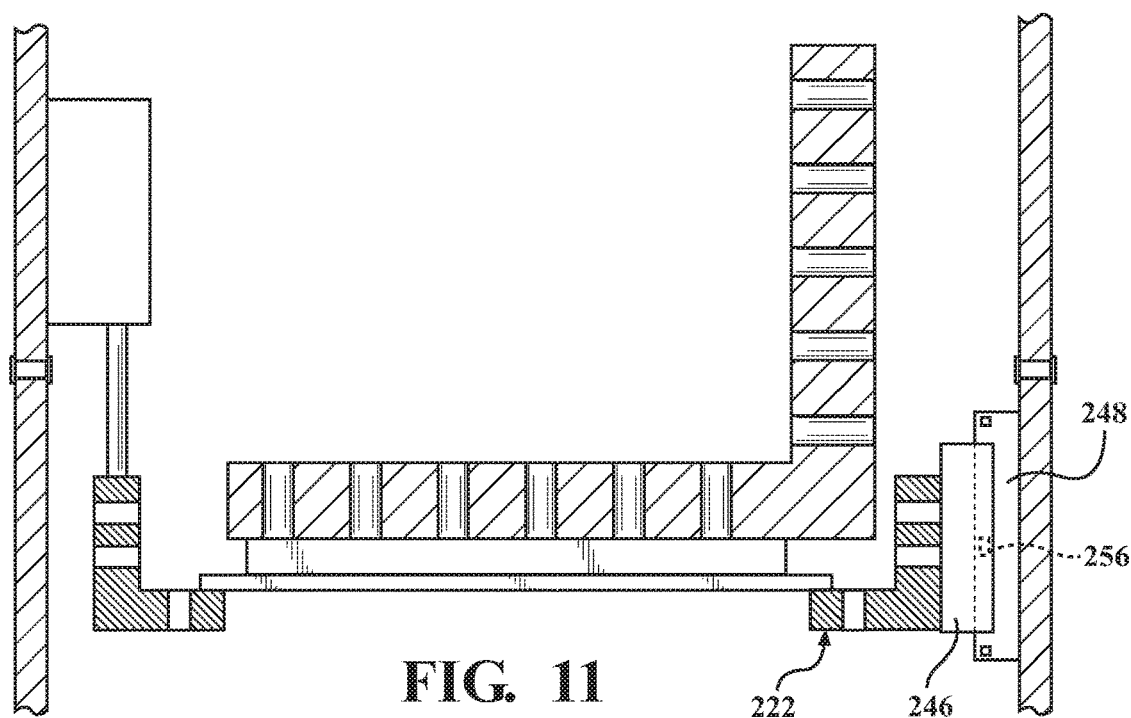
FIG. 11 is a partial cross-sectional view of the display system illustrating connection of an actuator to the display stack according to one embodiment of the present disclosure.

The guide rail 246 provided on the display stack 214 engages the guide rail 248 provided on the system housing 212 such that the display stack 214 is movable in relation to the system housing 212 in the directions indicated by arrows 1 and 2 (FIG. 2). To reduce friction between the guide rails 246, 248, it is envisioned that the guide systems 242, 244 may include bearing assemblies or other such suitable components. Although shown as being provided on the heat sink 224 in the particular embodiment of the disclosure seen in FIG. 2, it should be appreciated that the particular location and/or orientation of the guide rail 246 may be varied in alternate embodiments of the disclosure. For example, as seen in FIG. 11, the guide rail 246 may be provided on the carrier 222.

To facilitate movement of the display stack 214 through its range of motion, the display system 100 includes a focus mechanism 250. The focus mechanism 250 includes an actuator 252 that is operatively connected to the display stack 214 to apply a force thereto in the directions indicated by arrows 1 and 2 (FIG. 2) to cause corresponding translation of the display stack 214 and adjustment in the focus of the display panel 216. The actuator 252 may include a motor (e.g., a DC or piezoelectric motor), or any other such mechanism suitable for the intended purpose of facilitating movement of the display stack 214 in the manner described herein. For example, the display stack 214 may be moved magnetically, through the use of a voice coil, a gear system, a direct drive system, pulleys, etc.

The actuator 252 may act upon the display stack in any manner suitable for the intended purpose of repositioning the display stack 214 in the manner described herein. For example, in one embodiment, it is envisioned that the actuator 252 and the display stack may be threadably engaged such that rotatable motion of the actuator 252 is translated into linear motion of the display stack 214. It should be appreciated, however, that various alternate structures and methods of causing translation of the display stack 214 may be employed in various embodiments of the disclosure, such as, for example, a gear train, a rack and pinion assembly, etc.

Figure 12:
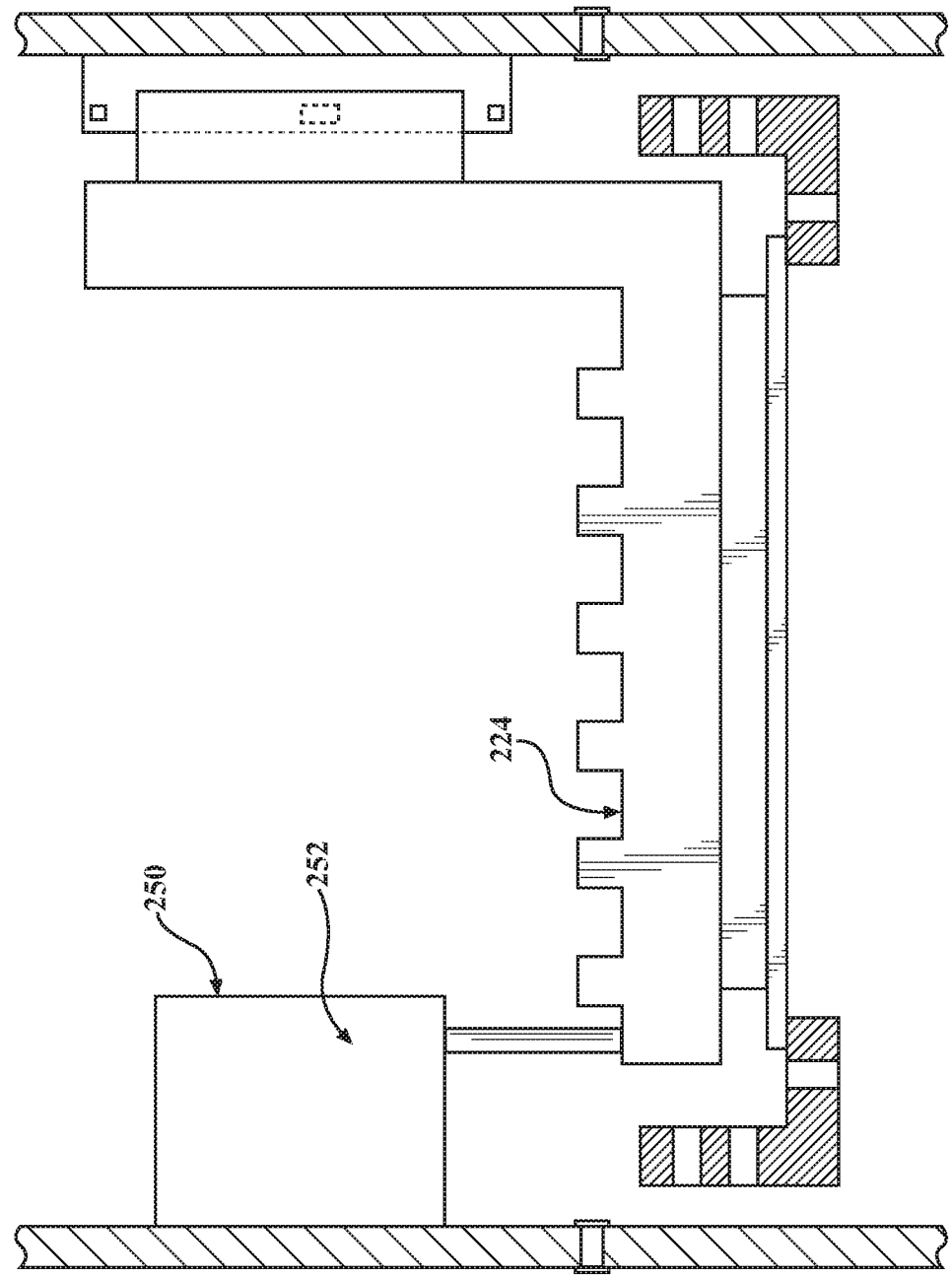
FIG. 12 is a partial cross-sectional view of the display system illustrating connection of an actuator to the display stack according to another embodiment of the present disclosure.
Figure 13:
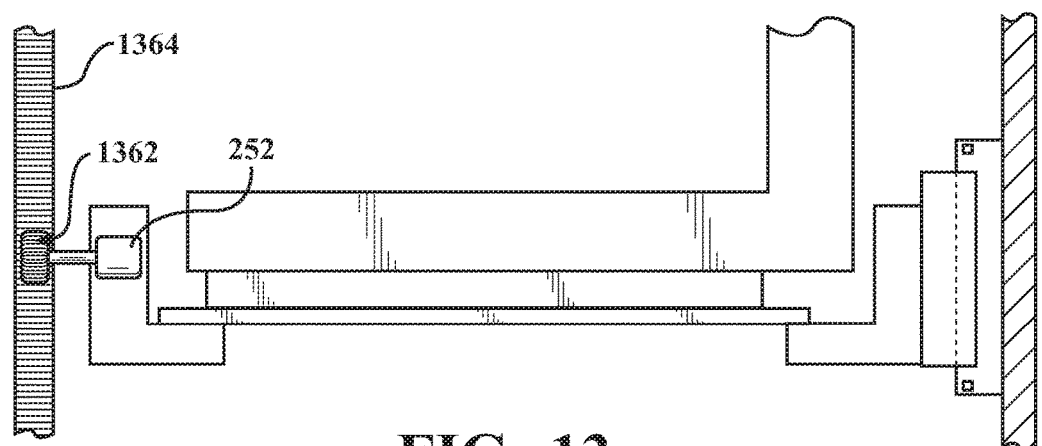
FIG. 13 is a partial cross-sectional view of the display system illustrating connection of an actuator to the display stack according to another embodiment of the present disclosure.
Figure 14:
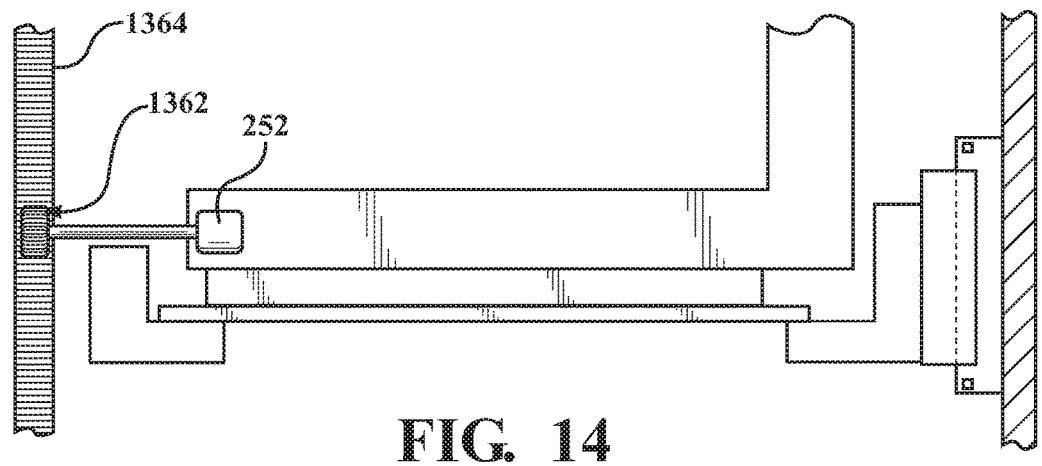
FIG. 14 is a partial cross-sectional view of the display system illustrating connection of an actuator to the display stack according to another embodiment of the present disclosure.

In the particular embodiment of the disclosure seen in FIG. 2, for example, the actuator 252 is shown as being fixedly secured to the system housing 212 and as extending into direct contact with the carrier 222. In alternate embodiments, however, the particular location and/or orientation of the actuator 252, as well as the point of contact with the display stack 214, may be varied. For example, as seen in FIG. 12, the actuator 252 may be configured and positioned to engage the heat sink 224. FIGS. 13 and 14 illustrate additional embodiments in which the actuator 252 is instead secured to the display stack 214 so as to apply a force to the system housing 212 to cause translation of the display stack. More specifically, in the embodiment seen in FIG. 13, the actuator 252 is mechanically connected to (e.g., positioned on) the carrier 222, and in the embodiment seen in FIG. 14, the actuator 252 is mechanically connected to (e.g., positioned on) the heat sink 224. In such embodiments, the actuator 252 is configured and positioned to apply a force to the system housing 212 to cause translation of the display stack 214. For example, as shown in FIGS. 13 and 14, the actuator 252 may include a gear mechanism 1362 that engages a corresponding track 1364 defined by the system housing 212.

In each embodiment of the disclosure described herein, in accordance with the discussion provided above, the carrier 222 and/or the heat sink 224 are configured and adapted to perform both structural and operational functions. For example, the carrier 222 provides structure to the display system 100 by supporting the display panel 216, and, thus, the heat sink 224, and provides an interface with the actuator 252 in the embodiment seen in FIG. 2 (and/or with the guide rail 246, as reflected in the embodiment seen in FIG. 11). The carrier 222, however, also provides an operational heat-transfer function through the thermal solution 228 by conducting heat away from the display panel 216, either through the material of construction used in the manufacture of the carrier 222, the inclusion of the surface discontinuities 230, or both. Similarly, the heat sink 224 provides structure to the display system 100 by supporting the display stack 214 via engagement of the guide rails 246, 248 in the embodiment seen in FIG. 2 (and/or by supporting the actuator 252 in the embodiment seen in FIG. 14). It is envisioned that the heat sink 224 may also support various electrical components of the display system 100, such as a flexible printed circuit (FPC), electrical connectors, cowl structures, etc. As with the carrier 222, however, the heat sink 224 also provides an operational heat-transfer function through the thermal solution 238 by conducting heat away from the display panel 216, either through the material of construction used in the manufacture of the heat sink 224, the inclusion of the surface discontinuities 230, or both.

Figure 15:
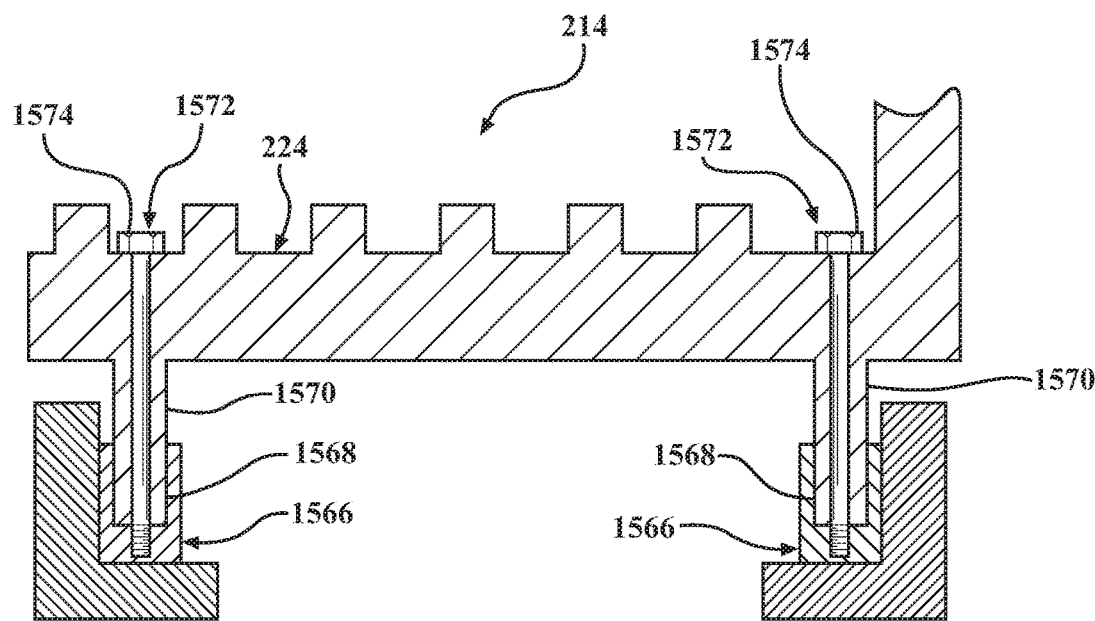
FIG. 15 is a partial cross-sectional view illustrating assembly of the display stack according to one embodiment of the present disclosure.

With reference now to FIG. 15, it is envisioned that the display stack 214 may be assembled by mechanically securing together the heat sink 224 and the carrier 222. In the interest of clarity, various components of the display system 100 (FIG. 1) have been omitted from FIG. 15 (e.g., the display panel 216, the guide rails 246, 248, the actuator 252, etc.). In the particular embodiment illustrated in FIG. 15, for example, the carrier 222 includes one or more anchors 1566 defining openings 1568 that are configured and dimensioned to receive one or more corresponding locating pins 1570 that extend from the heat sink 224. The anchors 1566 may include (e.g., may be formed from) any suitable material, such as, for example, Kalix®, plastic, polymeric materials, metallic materials, etc. Embodiments are thus envisioned in which the carrier 222 and the anchors 1566 may include (e.g., may be formed from) the same materials, as well as embodiments in which the carrier 222 and the anchors 1566 are formed from different materials. In various implementations, the locating pins 1570 and the anchors 1566 may be configured such that an interference fit is created therebetween to secure the heat sink 224 in relation to the carrier 222. Additionally, or alternatively, one or more fasteners 1572 may be utilized (e.g., an adhesive, a mechanical fastener, such as a bolt, rivet, nut, etc.). In the particular embodiment seen in FIG. 15, for example, a screw 1574 is inserted through the locating pins 1570 of the heat sink 224 into the anchors 1566.

With reference now to FIGS. 1 and 2, a discussion of the general operation of the display system 100 will be provided. To adjust the focus of the display panel 216, force is applied to the display stack 214 (e.g., to the carrier 222) via the actuator 252 to cause movement of the display panel 216, the carrier 222, and the heat sink 224 in unison within the system housing 212. More specifically, as the actuator 252 acts upon the display stack 214, the display stack 214 moves in the directions indicated by arrows 1 and 2 (FIG. 2), during which movement, the display panel 216 is repositioned within the system housing 212 via securement between the carrier 222 and the display panel 216. As the display stack is repositioned, the display stack 214 is supported by the guide rails 246, 248, which allow for movement of the display stack 214 (e.g., linear movement in the illustrated embodiment) through an space 254 defined within the system housing 212. More specifically, during repositioning of the display stack 214, the guide rail 246 traverses the guide rail 248. To confine movement of the display stack 214 to a predetermined range of motion, it is envisioned that one or more of the guide rails 246, 248 may include stops 256, as shown in FIG. 2.

During use of the display system 100, heat generated by the display panel 216 is carried away by the thermal solution 228 integrated into the carrier 222 and/or the thermal solution 238 integrated into the heat sink 224. For example, when formed from materials having high thermal conductivity, heat will be conducted away from the display panel 216 by the carrier 222 and/or the heat sink 224. For a given power input, the temperature rise in the display panel 216 (for example) will be inversely proportional to the exposed surface area of the thermal solution 228 (i.e. a larger surface area will result in lower surface temperature at a particular power input). Thus, for a given power input (or range of power inputs), by including and tuning the size and/or scale of the surface discontinuities 230, appropriate thermal regulation can be achieved to maintain the temperature of the display panel 216 below an acceptable threshold during operation. Heat dissipation and thermal regulation in the heat sink 224 can be likewise controlled and regulated.

Heat dissipation may be further augmented by facilitating airflow through the system housing 212. For example, it is envisioned that repositioning of the display stack 214 via the actuator 252 may create a bellows effect that draws cooler air into the interior space 254, which may be either generally open or sealed, and expels warmer air from the system housing 212. The ingress and egress of air may be facilitated by the inclusion of one or more openings 258 positioned in any suitable location. For example, as seen in the embodiment illustrated in FIG. 2, the system housing 212 may include a series of sealed vents 260. As air is drawn into the interior space 254, the air flows across the carrier 222 and/or the heat sink 224, and, thus, the thermal solutions 228, 238, such that the air picks up heat and transfers it away from the display panel 216 to reduce the operating temperature.

Figure 16:
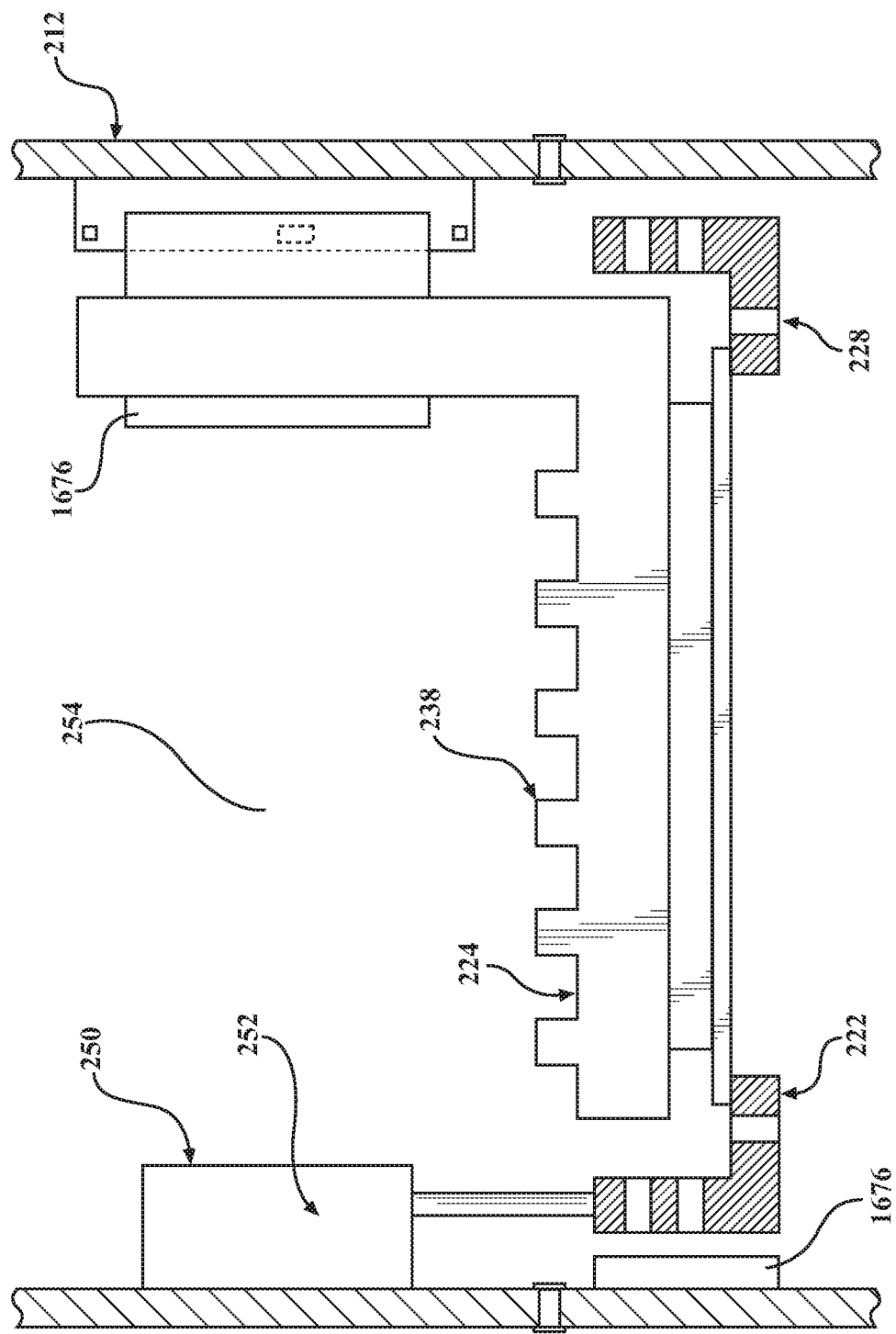
FIG. 16 is a partial cross-sectional view of an alternate embodiment of the display system including an airflow device.

In certain embodiments, it is envisioned that airflow through the interior space 254 and across the thermal solution 228 and/or the thermal solution 238 may be augmented through the incorporation of one or more airflow devices 1676 (FIG. 16), such as a fan, circulator, or the like. In such embodiments, the airflow device 1676 may be configured and positioned in any manner suitable for the intended purpose of circulating air into and out of the system housing 212. For example, the airflow device(s) 1676 may be positioned on, or otherwise secured to, the carrier 222 and/or the heat sink 224 (as seen in FIG. 16), the focus mechanism 250 (e.g., the actuator 252), the system housing 212, etc.

In general, a physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone).

The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As described above, one aspect of the present technology is the gathering and use of data available from various sources, such as from sensors or user profiles, to improve the delivery to users of content associated with the display system 100. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Further, other uses for personal information data that benefit the user are also contemplated by the present disclosure. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users.

Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of user-profile-based delivery of content, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be displayed to users by inferring preferences based on non-personal information data or a bare minimum amount of personal information, such as the content being requested by the device associated with a user, other non-personal information available to the device, or publicly available information.

Persons skilled in the art will understand that the various embodiments of the disclosure described herein and shown in the accompanying figures constitute non-limiting examples. Additionally, persons skilled in the art will understand that the elements and features shown or described in connection with one embodiment may be combined with those of another embodiment without departing from the scope of the present disclosure.

In the preceding description, reference may be made to the spatial relationship between the various structures illustrated in the accompanying drawings and to the spatial orientations of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," etc., should be understood to describe a relative relationship between structures and/or a spatial orientation of the structures.

The use of terms such as "approximately" and "generally" should be understood to allow for variations in any numerical range or concept with which they are associated. For example, it is envisioned that the use of terms such as "approximately" and "generally" should be understood to encompass variations on the order of 25%, or to allow for manufacturing tolerances and/or deviations in design.

What is claimed is:

1. A wearable display device, comprising:
a system housing including a cavity having a linear axis extending generally in parallel with first and second side walls enclosing the cavity;
a display stack enclosed within the cavity and movable along the linear axis, the display stack comprising:
a display panel;
a support chassis configured to support a side of the display panel, to couple the display panel to the first side wall, and to facilitate heat transfer from the display panel, across the support chassis, and into the cavity of the system housing; and
a heat sink directly supported by an opposite side of the display panel and configured to thermally couple the display panel to the second side wall to facilitate heat transfer from the display panel, across the heat sink, and to the system housing; and
an actuator configured to couple the first side wall and the support chassis and to act on the support chassis to move the display stack along the linear axis.

2. The wearable display device of claim 1, further comprising:
a first guide fixed on the second side wall; and
a second guide fixed on the heat sink and movable along the first guide,
wherein the first guide and the second guide are configured to guide the display stack along the linear axis so that the display stack is adjustable along a predetermined range of motion.

3. The wearable display device of claim 2, wherein the first guide includes stops that mark a beginning and an end of the predetermined range of motion.

4. The wearable display device of claim 1, wherein when the actuator acts on the support chassis, movement of the actuator creates a bellows effect that draws cooler air into the cavity and expels hot air from the cavity.

5. The wearable display device of claim 1, wherein the system housing is sealed around the display stack, and wherein the system housing includes openings in the first and second side walls that are configured to facilitate an exchange of hot air and cold air between the cavity and an external environment.

6. The wearable display device of claim 1, wherein the system housing is sealed around the display stack, and wherein the system housing includes an airflow device coupled to the first side wall that is configured to actively facilitate a flow of hot air and/or cold air between the cavity and an external environment.

7. The wearable display device of claim 1, wherein the system housing includes an internal viewing window that is configured to protect the display stack from external interference while being repositioned and to allow a user to observe the display stack.

8. The display system of claim 1, wherein the support chassis includes openings that fully or partially extend through or into the support chassis, wherein the openings are configured as vents, recesses, indentations, channels, or a combination thereof, and wherein the openings facilitate heat transfer from the support chassis into the cavity of the system housing.

9. A head display system, comprising:
an outer housing defining a channel having a longitudinal axis;
a display stack secured within the channel, the display stack comprising:
a single display panel having a first side and a second side opposing the first side;
a heat transfer component directly contacting the first side of the display panel and including a first thermal solution having surface discontinuities, the heat transfer component configured to dissipate thermal energy from the display stack; and
a carrier supporting the second side of the display panel and the heat transfer component, the carrier including a second thermal solution having surface discontinuities, and the carrier configured to unify the display stack so that the display stack is movable in unison along the longitudinal axis within the channel; and
an actuator directly coupling the outer housing and the carrier, the actuator configured to adjust a position of the display stack within the channel.

10. The head display system of claim 9, wherein the display stack further comprises:
a protective member composed of a conductive material and positioned between the second side of the display panel and the carrier, wherein the conductive material is configured to facilitate heat transfer between the display panel and the carrier.

11. The head display system of claim 9, wherein the surface discontinuities of the first thermal solution have projections that depend outward from an external surface of the heat transfer component so that the display stack has additional surface area that increases air flow and facilitates heat transfer.

12. The head display system of claim 11, wherein the projections extend from the carrier or the heat transfer component in an orthogonal or non-orthogonal direction so that air flow is increased within the channel.

13. The head display system of claim 9, wherein the surface discontinuities of the second thermal solution include openings that fully extend through the carrier so that the openings are configured as vents.

14. The head display system of claim 9, wherein the surface discontinuities of the first thermal solution or the second thermal solution include openings that partially extend inward into the heat transfer component or the carrier so that the openings are configured as recesses, indentations, channels, or a combination thereof.

15. A display system, comprising:
an adjustable display stack, comprising:
a thermal conductor configured to dissipate heat from a first side of the adjustable display stack;
a bezel configured to facilitate heat transfer from a second side of the adjustable display stack; and
a display panel positioned between the thermal conductor and the bezel;
a housing surrounding the adjustable display stack and having a guide path, the guide path regulating movement of the bezel or the thermal conductor relative to a first wall of the housing so that the adjustable display stack is movable within the housing along the guide path; and
a focus mechanism secured to a second wall of the housing, the focus mechanism including an actuator that is mechanically interfaced with the bezel or the thermal conductor, the actuator configured to cause movement of the adjustable display stack within the housing along the guide path.

16. The display system of claim 15, wherein the actuator includes a motor that is configured to facilitate movement of the adjustable display stack along the guide path.

17. The display system of claim 15, wherein the housing includes a gear path extending parallel to the guide path, and wherein the actuator includes gears that are movable along the gear path so that the adjustable display stack is movable along the guide path.

18. The display system of claim 15, wherein the guide path includes a first guide path positioned on the housing and a second guide path positioned on the bezel or the thermal conductor, and wherein the first guide path and the second guide path are configured as low-friction guide rails.

19. The display system of claim 18, wherein the second guide path fits within and is movable along the first guide path, and wherein the first guide path includes stops that define a predetermined range of motion for the adjustable display stack.

20. The display system of claim 15, wherein the actuator and the bezel or the thermal conductor have a threaded connection so that the actuator is configured for rotation, and wherein when the actuator rotates, the rotation is translated into linear motion of the adjustable display stack.

* * * * *